Aug. 29, 1933.　　　　S. EGGLESTON　　　　1,924,488
CONVEYER SYSTEM
Filed Dec. 4, 1930　　　　6 Sheets-Sheet 1

Inventor
Smith Eggleston
By Stryker & Stryker
Attorneys

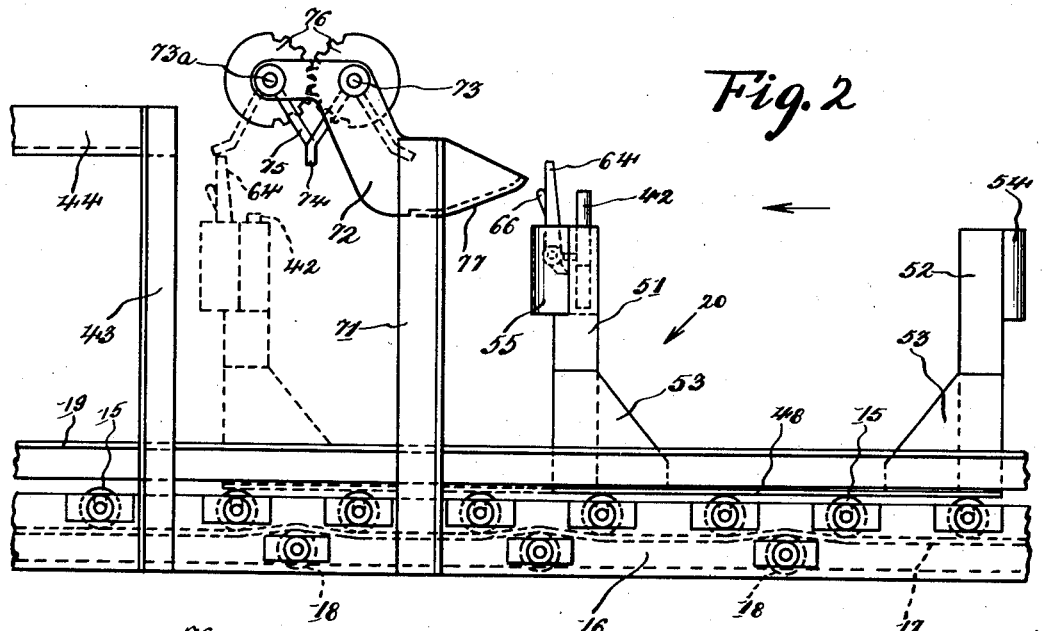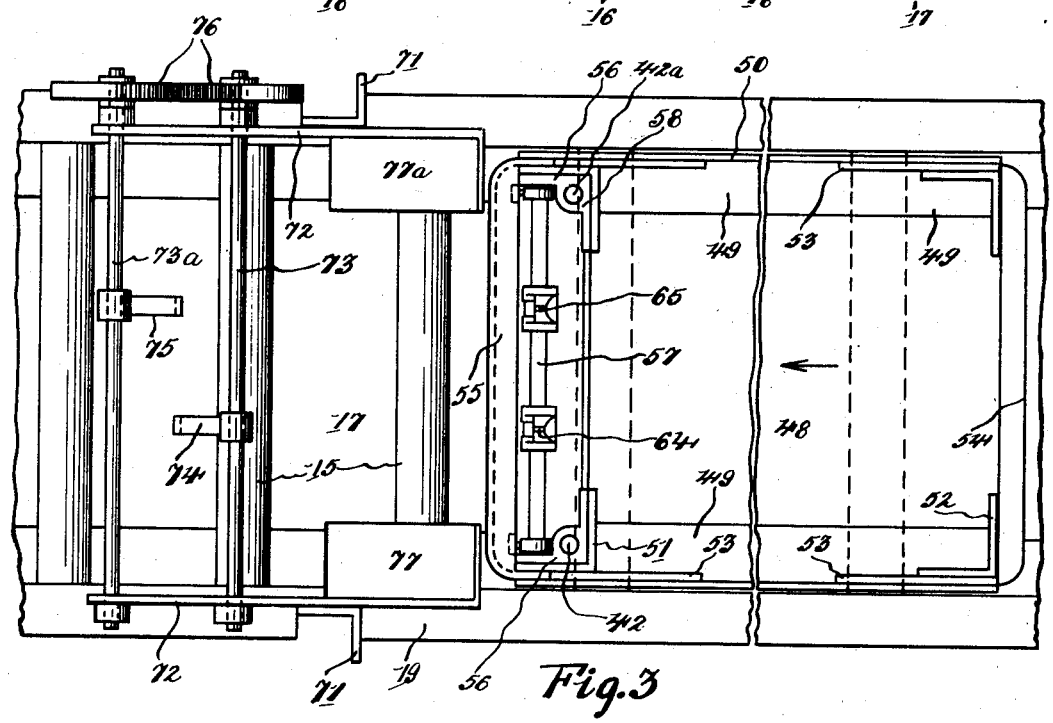

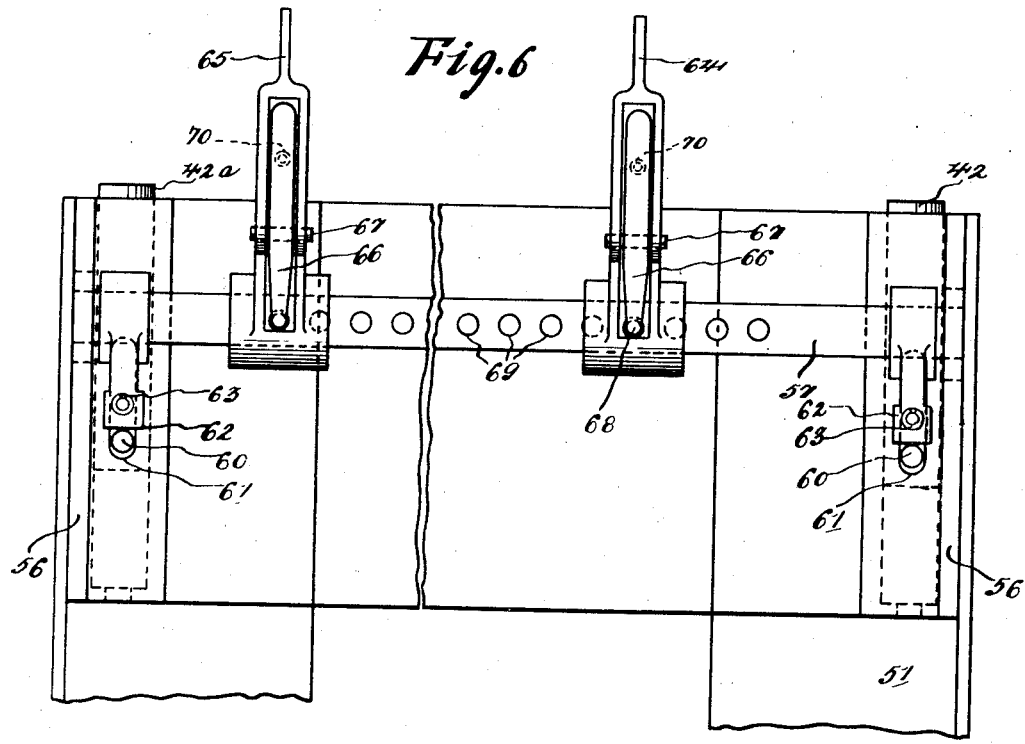
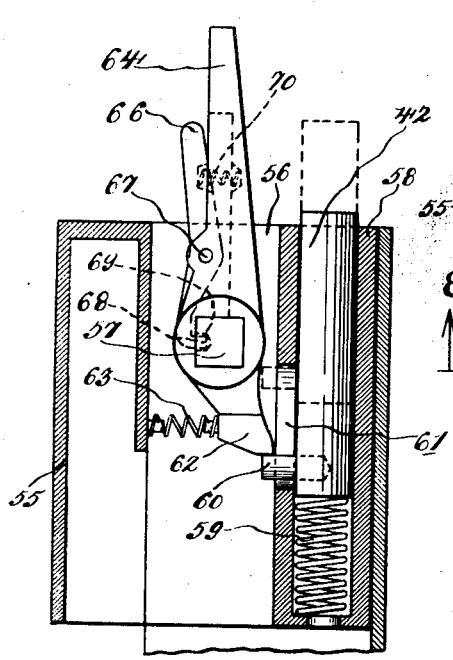
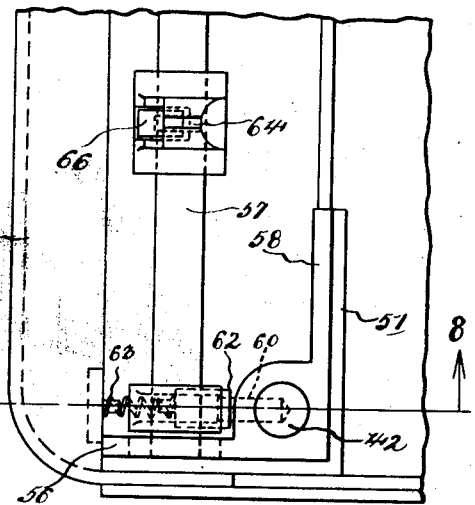

Aug. 29, 1933.  S. EGGLESTON  1,924,488
CONVEYER SYSTEM
Filed Dec. 4, 1930  6 Sheets-Sheet 5

Inventor
Smith Eggleston
By Stryker & Stryker
Attorneys

Aug. 29, 1933.      S. EGGLESTON      1,924,488
CONVEYER SYSTEM
Filed Dec. 4, 1930      6 Sheets-Sheet 6
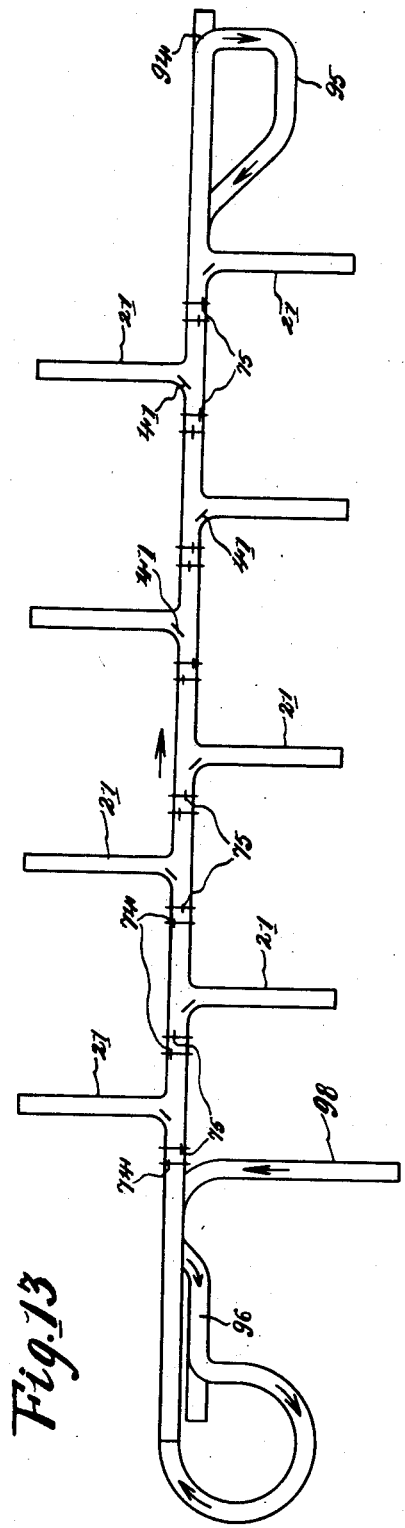
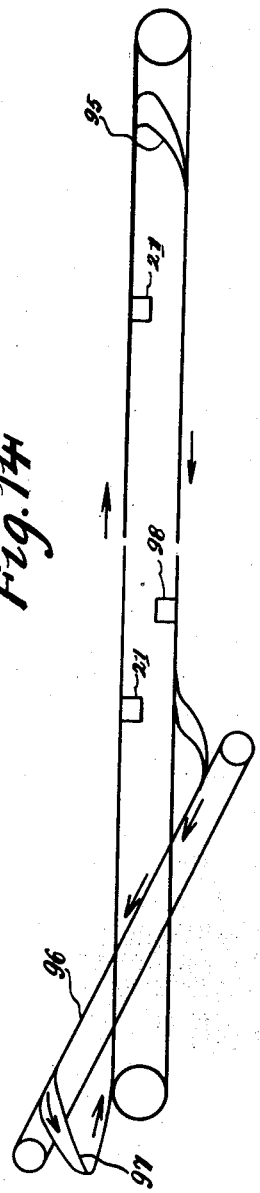
Inventor
Smith Eggleston
By Stryker & Stryker
Attorneys Patented Aug. 29, 1933

1,924,488

UNITED STATES PATENT OFFICE 1,924,488

CONVEYER SYSTEM

Smith Eggleston, St. Paul, Minn., assignor to Standard Conveyor Company, St. Paul, Minn., a corporation of Minnesota Application December 4, 1930. Serial No. 500,019

20 Claims. (Cl. 198—38)

This invention relates to a conveyer system having carriers propelled along a main conveyer and unloading stations or branch conveyers to which the carriers may be automatically delivered under control of selecting devices located on the carriers.

It is my object to provide, in a system of this kind, novel and efficient means for switching or diverting carriers from the main conveyer to the branch conveyers or side stations.

Other objects are:

1. To provide means for diverting the carriers from the main conveyer at a large number of points with certainty and by simplified mechanism;

2. To reduce the cost of erection by providing stationary switching devices which are similarly located at the several switching or diverting points;

3. To provide improved carriers for coaction with such stationary switching devices; and 4. To provide novel and efficient mechanism for causing carriers to continue along the main conveyer in the event that the branch conveyer for which the load is intended has been previously filled with carriers or contains a predetermined number of carriers.

Further objects will appear and be more fully pointed out in the following specification and claims.

Figure 1:
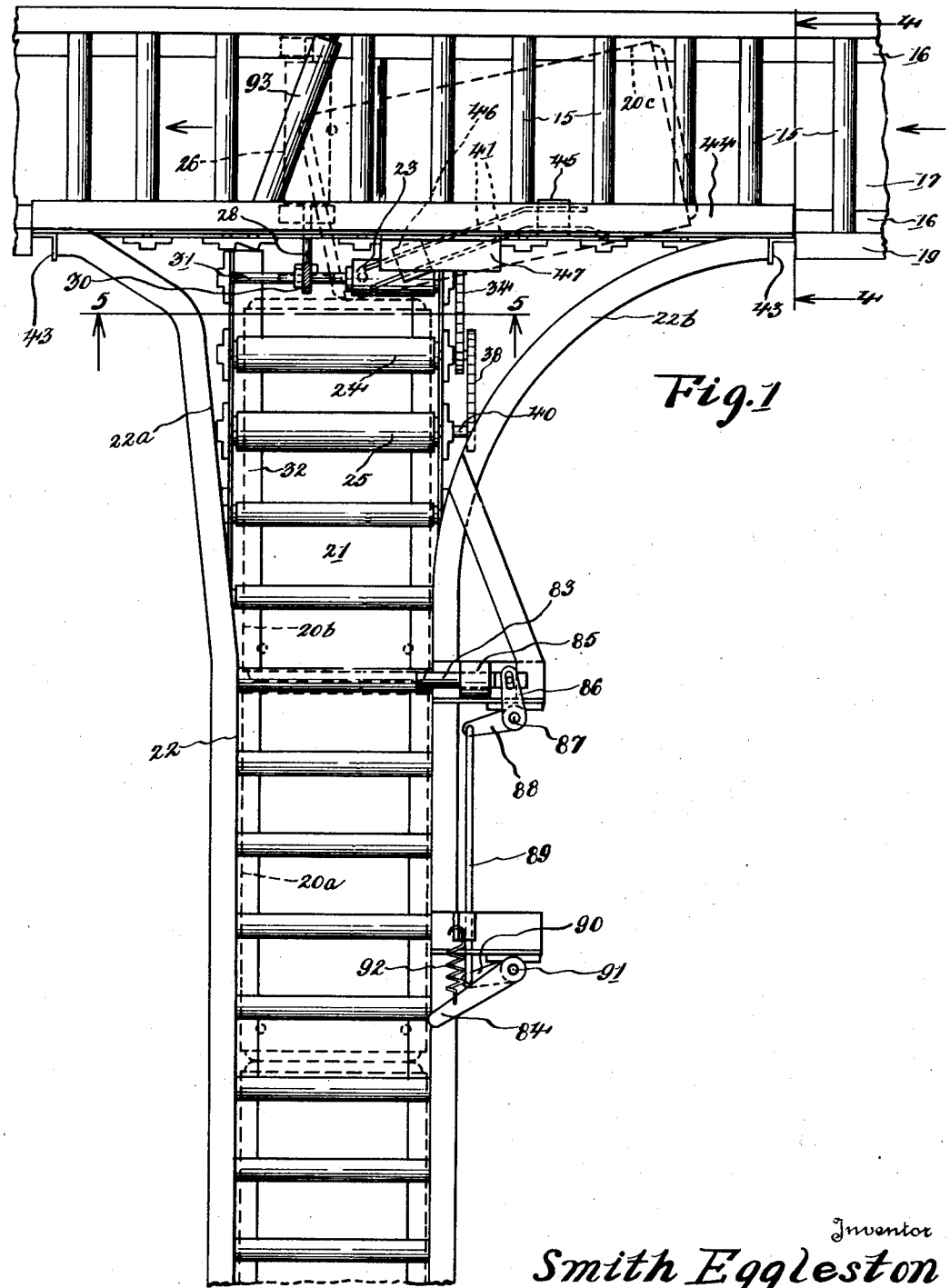
Figure 4:
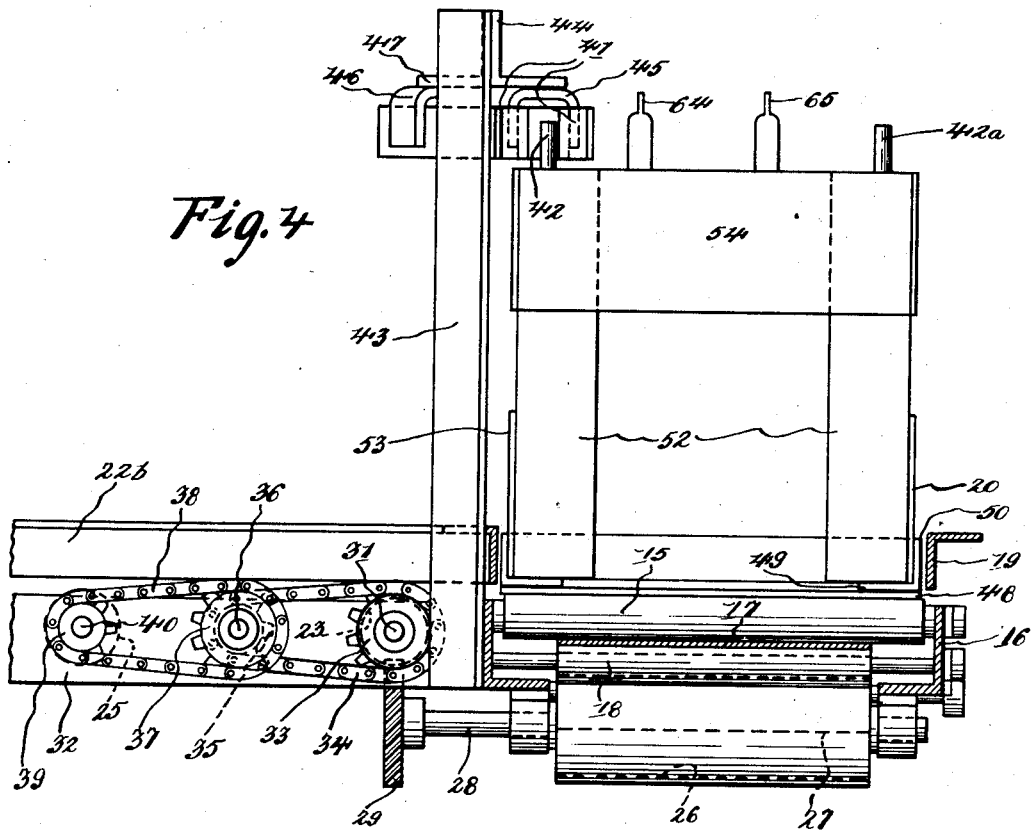
Figure 5:
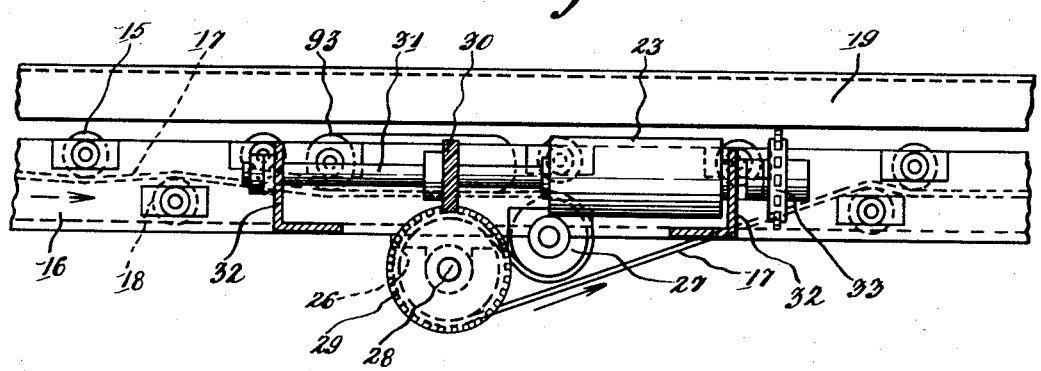
Figure 9:
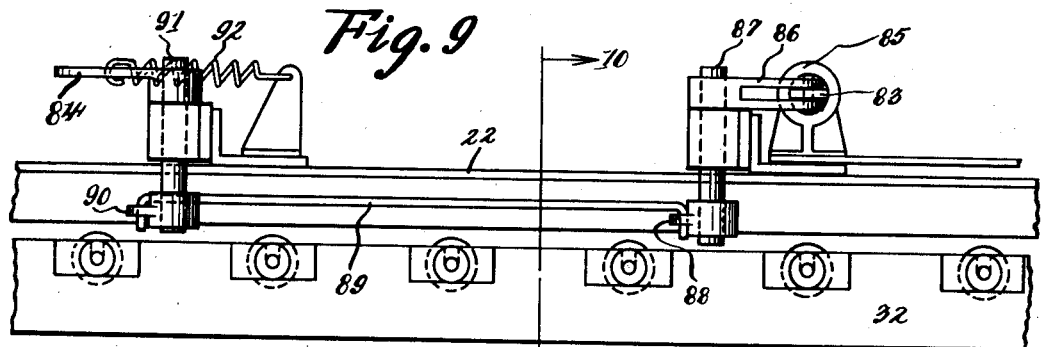
Figure 10:
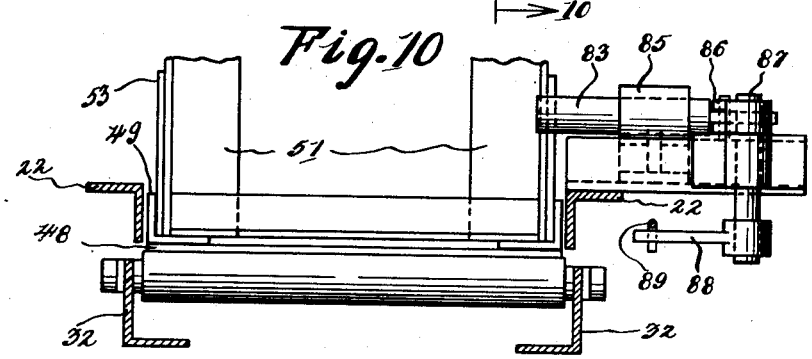
Figure 11:
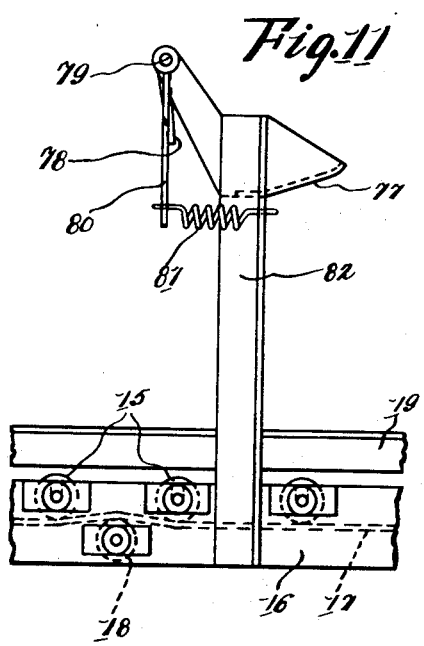
Figure 12:
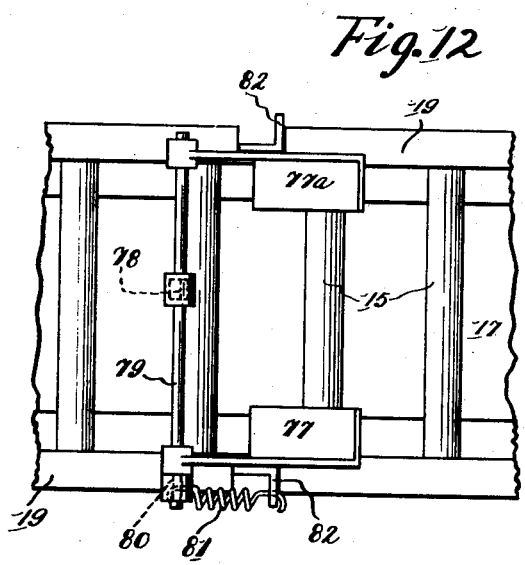

Referring to the accompanying drawings; Figure 1 is a plan view of a branch conveyer or unloading station, together with the adjacent portion of the main conveyer; Fig. 2 is a side elevation of a portion of the main conveyer, preferably constituting the approach to a branch conveyer and also showing one of the carriers; Fig. 3 is a plan view of the mechanism shown in Fig. 2; Fig. 4 is a transverse section through the main conveyer taken on the line 4—4 of Fig. 1; Fig. 5 is a transverse section through the branch conveyer taken on the line 5—5 of Fig. 1; Fig. 6 is a front elevation showing in detail the upper portion of one of the carriers with the bumper removed to show parts otherwise concealed; Fig. 7 is a fragmentary plan view of one of the carriers; Fig. 8 is a vertical section taken on the line 8—8 of Fig. 7; Fig. 9 is a side elevation showing the stop mechanism on the branch conveyer; Fig. 10 is a vertical section taken on the line 10—10 of Fig. 9; Fig. 11 is a side elevation of an alternate and somewhat simplified form of actuating device for the switch-engaging mechanism on the carrier; Fig. 12 is a plan view of the device shown in Fig. 11; Fig. 13 is a diagrammatic plan of a typical form of the system and Fig. 14 is a diagrammatic side view of the same.

The main conveyer illustrated is of the type usually placed in substantially horizontal position and having a bed of freely rotating rollers 15 supported on side rails 16 and adapted to be rotated by an endless, power-driven belt 17. This belt is held in driving engagement with the lower peripheries of the rollers 15 by a series of rollers 18. At each side a guide 19 in the form of an angle bar is provided for the carriers 20 which are supported on the upper peripheries of the rollers 15. Thus it will be seen that the main conveyer is of the well-known "live roller" type.

At selected points along the main conveyer unloading stations or branch conveyers 21 are located to receive the carriers 20. As shown in Figs. 1, 4, 5 and 10 each branch conveyer 21 is preferably of the gravity type having a sloping bed of rollers to support the carriers and a guide rail 22 projecting above the rollers at each side. Diverging portions 22a and 22b of the guide rails are connected to the frame of the main conveyer. Rollers 23, 24 and 25 near the entrance to the branch conveyer are positively driven to move the carriers quickly out of the path of other carriers which may follow along the main conveyer. To drive the rollers 23, 24 and 25, the belt 17 is snubbed around a drum 26 which is journaled in bearings secured to the bottoms of the rails 16, the belt being guided around another roller 27, as best shown in Fig. 5. The drum 26 is fixed on a shaft 28 and an end of said shaft projects from one of its bearings and has a spiral gear 29 secured to its extremity. The gear 29 drives a pinion 30 fixed on a shaft 31 supporting the roller 23. The shaft 31 is journaled in supporting rails 32 and the roller 23 is preferably shorter than the rollers 24 and 25 to permit the return of partially diverted carriers to the main conveyer, as hereinafter described. At one end of the shaft 31 is provided with a sprocket wheel 33 for driving a chain 34 which, in turn, drives a sprocket wheel 35 on a shaft 36. The latter shaft drives the roller 24 and also a sprocket wheel 37 for driving a chain 38 having driving engagement with a sprocket wheel 39. A shaft 40 is driven by the sprocket wheel 39 and drives the roller 25. It will be noted that the driven sprocket wheels 35 and 39 are smaller than the driving sprocket wheels 33 and 37 so that the speed of the rollers 24 and 25 is progressively increased.

A stationary switch is provided near the entrance to the branch conveyer. This switch consists of a pair of spaced, parallel bars 41 extending substantially horizontally above the path of the carriers 20 and in such position as to receive and guide upwardly extensible pins 42 on the carriers 20, as shown in Fig. 4. To support the switch bars 41 a frame consisting of upright members 43 connected by a horizontal member 44 is provided. The upright members 43 are secured to one of the side rails 16 of the main conveyer. Inverted U-shaped clips 45 and 46 rigidly connect the switch members 41 together. The clip 45 is fixed on the bottom of the frame member 44 and the clip 46 is secured to the bottom of a short angle bar 47 fastened to a vertical face of the member 44. The switch bars 41 form a guide groove between them for the pins 42 on the carriers 20 and this groove has an open receiving end above the main conveyer and an open delivery end above the branch conveyer. At the delivery end of the guide the bars 41 terminate directly above the roller 23 so that when a pin 42 is released by the switch bars the carrier is free to be further advanced along the branch conveyer under the influence of the roller 23 or to be returned to the main conveyer as hereinafter described.

The branch conveyer and stationary switching mechanism above described may be duplicated at the several unloading points along one side (the left) of the main conveyer and similar conveyers and switches may be placed at selected points along the opposite side (or right) of the main conveyer. A pin 42a near the front corner of each carrier, opposite the pin 42, is provided to engage the switch bars 41 where the latter are disposed to turn or divert the carriers to the right.

The carrier 20 has a smooth bottom 48 adapted to rest on the rollers 15 and at each longitudinal, bottom corner an angle bar 49 (Fig. 3) has upwardly projecting flanges 50 to which are secured front corner posts 51 and rear corner posts 52, these posts being of angular form in cross section. Corner reinforcing plates 53 further connect the bars 49 with the posts 51 and 52. The posts 52 are connected together by a rear bumper 54. At the front of the carrier a bumper 55 projects and behind this bumper is mounted a pair of bearings 56 for a horizontal shaft 57. Integral with the bearings 56 are vertical sockets 58 for the pins 42 and 42a. The pins 42 and 42a are urged upward by coiled springs 59 in the sockets 58 and a lug 60 projects from each pin through a guide slot 61 in its socket. The lug 60 strikes the upper end of the slot 61 to limit upward movement of the pin 41. Fixed on the shaft 57 near the bearings 56 are detents or dogs 62 adapted to engage the lugs 60 to retain the pins 42 and 42a in downwardly retracted position against the action of the springs 59. Coiled springs 63 are retained under compression between the bumper 55 and dogs 62 to urge said dogs toward the lugs 60.

Slidable along the shaft 57 are similar feelers 64 and 65 adapted to be secured in selected positions on said shaft by manually operable latches 66. These latches are pivoted on pins 67 and their lower ends 68 are movable into recesses 69 in the shaft 57, small springs 70 being arranged to press the latches into engagement with selected recesses. The feelers 64 and 65 are arranged so that when their upper ends are moved rearwardly of the carrier, the shaft 57 is turned and actuates the dogs 62 to disengage the lugs 60 and permit the pins 42 and 42a to be thrust upward under the action of the springs 59.

Mechanism associated with each unloading station or branch conveyer is provided for actuating the feelers 64 and 65. As shown in Figs. 2 and 3, this actuating mechanism is supported on uprights 71 which are secured to the outer surfaces of the side rails 16 of the main conveyer. From the uprights 71 bracket arms 72 project to support a pair of parallel shafts 73 and 73a. Pendant from the shaft 73 is a finger 74 and a similar finger 75 projects downward from the shaft 73a. These shafts are connected together for rotation in unison by gears 76. The fingers 74 and 75 are fixed on their supporting shafts and normally hang freely with their lower ends in alignment with each other, as viewed from the side of the main conveyer, suitable balancing weights being provided on the gears 76. The uprights 71 also support a pair of cam members 77 and 77a adapted to engage the upper ends of the pins 42 and 42a respectively to retract said pins against the action of their springs 59. When pressed down by the cam members 77 and 77a, pins 42 and 42a are retained in retracted position by the dogs 62 until the feelers 64 and 65 are actuated against the action of the springs 63.

In Figs. 11 and 12 an alternate form of actuating device for a feeler on a carrier is illustrated. This device is designed for use with a carrier having a single feeler and, to engage such feeler, a finger 78 is fixed on a shaft 79, said shaft having a suitable support above the path of the carriers. Secured to one end of the shaft 79 is a downwardly projecting arm 80 which is connected by a stiff tension spring 81 to one of the uprights 82 supporting the device. The spring 81 is provided merely to prevent breakage in the event of accidental or improper placing of a stationary or heavy object on the carrier in position to engage said finger. In the normal operation the finger 78 does not move when engaged by a feeler on the carrier. Cams 77 and 77a for retracting the pins 42 and 42a on the carriers are also secured to the uprights 82. A finger 78 is associated with each switching device and the fingers 78 for the several switches are located on their supporting shafts 79 in positions to coact with a feeler, such as the feeler 64, in different positions transversely of the carrier.

Mechanism is provided for automatically causing a carrier, which is adjusted to be diverted at a given branch conveyer, to be returned to the main conveyer in the event that such branch conveyer is already occupied by a predetermined number of carriers. This mechanism is shown in detail in Figs. 1, 9 and 10. A stop plunger 83 may be projected into the path of carriers on each branch conveyer and is actuated by an arm 84 arranged to engage carriers on the branch conveyer. The plunger 83 is slidable in a bearing 85 and has a suitable connection with a crank 86 fixed on a pivot pin 87. Another crank 88 on the shaft 87 is connected by a link 89 to a crank 90 fixed on a pivot pin 91 supporting the arm 84. A coiled spring 92 connects the arm 84 to a fixed support in such a manner as to extend said arm into the path of carriers and to normally retract the stop plunger 83 from the path of said carriers. The stop plunger 83 is located at a distance slightly greater than the length of a carrier from the delivery end of the guide formed by the switch members 41 so that when the branch conveyer is filled with carriers the entrance thereto is blocked by the last carrier to enter the same. The rear end of the latter carrier is thus disposed at such a point that any subsequently diverted carrier is free to return to the main conveyer when it encounters such stationary, previously diverted carrier. To effect the return of the blocked carrier to the main conveyer, an oblique roller 93 is placed in the bed of the main conveyer in such a position that it influences the carriers to increased degree as they are guided by the end of the previously diverted carrier on the branch conveyer.

As shown diagrammatically in Figs. 13 and 14, the main conveyer has an upper reach for moving the carriers in one direction and a lower reach adapted to move them in the opposite direction, the same endless belt 17 being employed to actuate the supporting rollers for the carriers along both reaches. Near the delivery end of the upper reach, an arm 94 is arranged to sweep the carriers therefrom laterally onto a gravity section 95 and the gravity section transmits the carriers to the lower reach of the main conveyer. At the delivery end of the lower reach a suitable device is arranged to sweep the carriers therefrom and to deliver them to an inclined belt 96. This belt 96 discharges the carriers to a gravity section 97 which completes the circuit by transmitting them to the upper reach of the main conveyer. A feed conveyer 98 may be employed to load the carriers on the main conveyer and operators stationed at this feed conveyer or loading point adjust the feelers on the carriers to select the diverting point for each carrier. In the embodiment illustrated, the several branch conveyers are arranged to receive the carriers from the upper reach of the main conveyer and the feed conveyer 98 delivers them to the lower reach of the main conveyer.

Operation

At the loading point an operator selects the station to which a carrier is to be delivered by manipulating the latches 66 on the feelers 64 and 65 and moving said feelers to the proper positions along the shaft 57. It will be understood that by providing a plurality of feelers diverting may be effected at a large number of points without unduly increasing the number of positions for each feeler. When a carrier with the feelers adjusted thereon is placed on the main conveyer it is carried thereby in the direction indicated by arrows in the drawings to or past the branch conveyers 21 successively. As the carrier approaches each diverting point it passes beneath the stationary cams 77 and 77a which retract the pins 42 and 42a to positions corresponding to that indicated in full lines in Fig. 8, where said pins are retained by the dogs 62. Thereafter, as the carrier passes shafts 73 and 73a where the fingers 74 and 75 are so located as to actuate the feelers 64 and 65, said feelers will be engaged substantially simultaneously by the fingers. The fingers being movable only in opposite directions by reason of their connecting mechanism including the gears 76, are prevented from moving when both are struck from one side by the feelers on a carrier. Thus the feelers are forced backwardly on the carrier and turn the shaft 57 to release the lugs 60 against the action of the springs 63. The pins 42 and 42a are now projected upward by the springs 59 and thereafter one of said pins will pass between a pair of the switch bars 41. The carrier is now guided by the switch bars until its front end is supported on the short roller 23 rotating to move the carrier along the branch conveyer. During the diverting operation the carrier is turned by the combined action of the rollers 15, 23, 24 and 25 and its speed is increased as it is acted upon by the rollers 23, 24 and 25. The increased speed causes the carrier to move quickly out of the path of succeeding carriers on the main conveyer.

When a carrier strikes the arm 84 on the branch conveyer, the stop 83 is thrust into the path of succeeding carriers, as shown in dotted lines in Fig. 1. For example, when a carrier 20a is stopped in contact with the arm 84 the stop plunger 83 is thrust into the path of carriers, such as those indicated at 20b and 20c. The subsequently diverted carrier 20b now blocks the entrance to the branch conveyer and if a third carrier 20c starts to enter the branch conveyer it strikes the rear end of the carrier 20b and is guided across said end until the carrier 20c is engaged by the roller 93 which returns it to the main conveyer. The main conveyer is endless, as indicated in Figs. 13 and 14, so that the carrier 20c continues around its endless path until it again arrives at the branch conveyer where it is adjusted to be diverted. If this station has been cleared of obstructing carriers, the carrier 20c passes thereto in the usual manner.

When a carrier arrives at an actuating device for the feelers where the fingers 74 and 75 are out of the path of the feelers, the pins 42 and 42a remain in their retracted positions and the carrier passes freely beneath the switch bars 41 of the next or associated station. The same is true if only one of the feelers 64 or 65 strikes a finger 74 or 75. As indicated in dotted lines in Fig. 2, in the latter case, the feeler which strikes the finger merely moves the finger out of its path, the other finger of the pair being free to move in the opposite direction and the springs 63 having sufficient tension to prevent movement of the dogs 62 in such case.

Where only one feeler is required on a carrier, the actuating mechanism for the feeler shown in Figs. 11 and 12 may be employed. The finger 78 coacts with a feeler on a carrier (in case the latter is set to engage the finger) to trip the switch pins 42 and 42a. The stationary switch bars 41 at the associated diverting point are then engaged by the projecting pin 42 or 42a to divert the carrier. It will be understood that the several fingers 78 near the diverting points are positioned to coact with a feeler on a carrier at different transverse positions, and the pins 42 and 42a are only tripped to project from the carrier at the selected diverting point.

I have illustrated my invention as applied to a conveyer of the type described in Patent No. 1,576,710, dated March 16, 1926, to Gordon W. Beulke, but it will be understood that the device may be used in connection with a belt conveyer of the common type in which the carriers are supported directly on a moving belt. It will also be understood that the rollers of the branch conveyers may be driven in the same manner as those of the main conveyer, or a common belt conveyer may be employed for each of the branch stations.

Having described my invention what I claim as new and desire to protect by Letters Patent is:

1. A conveyer system having in combination a conveyer, a station laterally adjacent to said conveyer, a carrier movable along said conveyer, a switch associated with said station for diverting carriers thereto from said conveyer, extensible and retractile means on said carrier adapted to engage said switch when extended, an element on the carrier, means under control of said element for extending said switch engaging means and means associated with said station for engaging said element to divert the carrier.

2. A conveyor system having in combination a conveyer, a station laterally adjacent to said conveyer, a carrier movable along said conveyer, a switch associated with said station for diverting carriers thereto from the conveyer, said switch being out of the path of said carriers, extensible and retractile means on said carrier adapted to engage said switch when extended, an element on the carrier, means on said carrier, under control of said element for actuating said switch engaging means and means associated with said station for actuating said element.

3. A conveyer system having in combination a conveyer, a station laterally adjacent to said conveyer, a carrier movable along said conveyer, a stationary switch associated with said station for diverting carriers thereto from the conveyer, movable means on said carrier to engage said switch, means for normally retaining said switch engaging means in predetermined position, a feeler on the carrier for actuating said last mentioned means, means for actuating said switch-engaging means and means associated with said station for actuating said feeler.

4. A conveyer system including a conveyer, a branch station laterally adjacent to said conveyer, a carrier movable along said conveyer, a stationary switch associated with said station for diverting carriers thereto from the conveyer, extensible and retractile means on said carrier adapted to engage said switch when extended, means for extending said last mentioned means, a detent for securing said extensible means in predetermined position, a feeler on the carrier for actuating said detent and means associated with said station for actuating said feeler.

5. A conveyer system comprising, a conveyer and a plurality of stations laterally adjacent to said conveyer, a stationary switch associated with each of said stations to divert carriers thereto from the conveyer, a carrier movable along said conveyer, an extensible and retractile switch engaging member on said carrier adapted to coact with said switches to divert the carrier from the conveyer, an element projecting from the carrier, means under control of said element to extend said extensible member and an actuating device for said element associated with each station.

6. A conveyer system comprising, a conveyer and a plurality of stations laterally adjacent to said conveyer, a stationary switch associated with each of said stations to divert carriers thereto from the conveyer, a carrier movable along said conveyer, a movable switch engaging member on said carrier adapted to coact with a plurality of said switches to divert the carrier from the conveyer, an element projecting from the carrier, means under control of said element for actuating said switch engaging member, said element being movable to different transverse positions on the carrier, and actuating devices for said element associated with the several stations and each located to operate said element in one of its transverse positions.

7. A conveyer system comprising, a main conveyer and a plurality of branch conveyers, a stationary switch associated with each of said branches to divert carriers thereto from the main conveyer, a carrier movable along said conveyer, said switches being mounted out of the path of said carrier, an extensible and retractile switch engaging member on said carrier adapted to coact with any of said switches to divert the carrier from the main conveyer, means for extending said switch-engaging member, a feeler projecting from the carrier and operatively connected to said extending means, said feeler being movable to different transverse positions on the carrier and actuating devices for said feeler associated with the several stations and each differently located transversely of the carrier.

8. A conveyer system having in combination a substantially horizontal conveyer, a station laterally adjacent to said conveyer, a stationary switch extending substantially horizontally to divert carriers to said station, a carrier movable along said conveyer, an extensible switch engaging member on the carrier adapted to coact with said switch to divert the carrier from the conveyer, means for controlling movement of said switch-engaging member to operative position, automatic means for retracting said extensible member from operative position, said controlling means having an element projecting from the carrier and an actuating device for said element associated with said station.

9. A conveyor system having in combination a substantially horizontal conveyer, a station laterally adjacent to said conveyer, a stationary switch extending parallel to said conveyer above the same to divert carriers to said station, a carrier movable along said conveyer beneath said switch, an upwardly extensible switch engaging member on the carrier adapted to coact with said switch to divert the carrier from the conveyer, means for extending said member, automatic means for retracting said extensible member, a detent for retaining said extensible member in retracted position, a feeler projecting from said carrier to trip said detent and an actuating device for said feeler associated with said station.

10. A conveyer system having in combination a substantially horizontal conveyer, a plurality of stations laterally adjacent to said conveyer, a stationary switch extending substantially horizontally adjacent to each station to divert carriers thereto, a carrier movable along said conveyer, said switch being out of the path of the carrier, an extensible switch engaging member on the carrier adapted to coact with any of said switches to divert the carrier from the conveyer, means associated with each of said stations for retracting said extensible member, means for extending said member, a feeler projecting from said carrier and operatively connected to said extending means, and an actuating device for said feeler associated with each station.

11. A conveyer system having in combination a conveyer, a multiplicity of stations laterally adjacent to said conveyer, switches for diverting carriers to said stations, carriers movable along said conveyer, a plurality of selecting members projecting from each carrier and movable thereon to select the branch station to which the carrier is to be diverted, a pair of pivoted fingers associated with each station to coact with a pair of said selecting members in diverting carriers and arranged to be actuated by said members, and connections between said fingers whereby actuation of one finger by a selecting member causes an opposite movement of the other finger and on simultaneous engagement of both fingers by a pair of selecting members, the fingers are locked against movement.

12. A conveyer system having in combination a conveyer, a multiplicity of stations laterally adjacent to said conveyer, switches for diverting carriers to said stations, carriers movable along said conveyer, a plurality of feelers projecting from each carrier and movable thereon to select the stations to which the carriers are to be diverted, a pair of fingers associated with each station to coact with said feelers to divert carriers and arranged to be actuated by said feelers, shafts severally supporting said fingers and gears connecting said shafts.

13. A conveyer system having in combination a conveyer, a multiplicity of stations to receive carriers from said conveyer, carriers movable along said conveyer, means for diverting carriers to said stations, a plurality of station selecting members on the carriers, a pair of fingers associated with each station to coact with said selecting members in diverting carriers and connections between the fingers of a pair, said connections being arranged to permit the free passage of a carrier when actuated by one of the selecting members on said carrier and to cause the carrier to be diverted when the fingers are simultaneously struck by a plurality of said members on the carrier.

14. A conveyer system having in combination a conveyer, a multiplicity of stations to receive carriers from said conveyer, carriers movable along said conveyer, means for diverting carriers to said stations, a plurality of station selecting members on the carriers, a pair of fingers associated with each station to coact with said selecting members in diverting carriers and connections between the fingers of a pair for positively moving the same whereby actuation of one finger by a selecting member causes an opposite movement of the other finger and on simultaneous engagement of both fingers by a pair of selecting members, the fingers are locked against movement.

15. A conveyer system having in combination a main conveyer, a branch conveyer to receive carriers from said main conveyer, carriers movable along the main conveyer, automatic switch means adapted to divert carriers from the main conveyor to the branch conveyer, means independent of said switch means for automatically blocking the entrance to said branch conveyer when the latter is filled and means for returning a subsequently, partially diverted carrier to the main conveyer when said blocking means are operative.

16. A conveyer system having in combination a main conveyer, a branch conveyer to receive carriers from said main conveyer, carriers movable along the main conveyer, automatic switch means adapted to divert carriers from the main conveyer toward the branch conveyer, means operable by a carrier on said branch conveyer when the same is filled with carriers to prevent the completion of a subsequent diverting operation and means for returning a partially diverted carrier to the main conveyer when said last mentioned means are operative.

17. A conveyer system having in combination a main conveyer, a branch conveyer to receive carriers from said main conveyer, carriers movable along the main conveyer, automatic switch means adapted to divert carriers from the main conveyer toward said branch, means for automatically stopping a carrier near the entrance to said branch conveyer when the same is filled with carriers and means for returning a subsequently, partially diverted carrier to the main conveyer upon the encounter of the same with a carrier at said entrance.

18. A conveyer system comprising, a main conveyer, a branch conveyer laterally adjacent to the main conveyer, carriers movable along the main conveyer to and past the branch conveyer, automatic switch means having a movable element on each carrier adapted to be set for diverting the carriers to said branch conveyer, means independent of said switch means for automatically blocking the entrance to said branch conveyer when the latter is filled, means for engaging a carrier on said branch conveyer to render said blocking means operative and means for returning subsequently switched carriers to the main conveyer when said blocking means are operative.

19. A conveyer system comprising, a main conveyer, a branch conveyer laterally adjacent to the main conveyer, carriers movable along the main conveyer to and past the branch conveyer, a stationary switch associated with said branch conveyer, a movable element on each carrier adapted to be set to coact with said switch for diverting the carriers to said branch conveyer, said switch having a delivery end near the entrance to said branch conveyer, means for automatically blocking the entrance to said branch conveyer at a point beyond said delivery end of the switch when said branch conveyer is filled and means for returning subsequently switched carriers to the main conveyer when said blocking means are operative.

20. A conveyer system comprising, a main conveyer, a branch conveyer laterally adjacent to the main conveyer, carriers movable along the main conveyer to and past the branch conveyer, stationary switch means associated with said branch conveyer, a movable element on each carrier adapted to be set to coact with said switch means for diverting the carrier to said branch conveyer, a stop associated with said branch conveyer to stop a carrier thereon in position to block the entrance to said branch conveyer, means engageable by a carrier on said branch conveyer and extending said stop into the path of carriers on said branch conveyer and means for returning subsequently switched carriers to the main conveyer upon the stoppage of a carrier on the branch conveyer near the entrance thereto.

SMITH EGGLESTON.